UNITED STATES PATENT OFFICE.

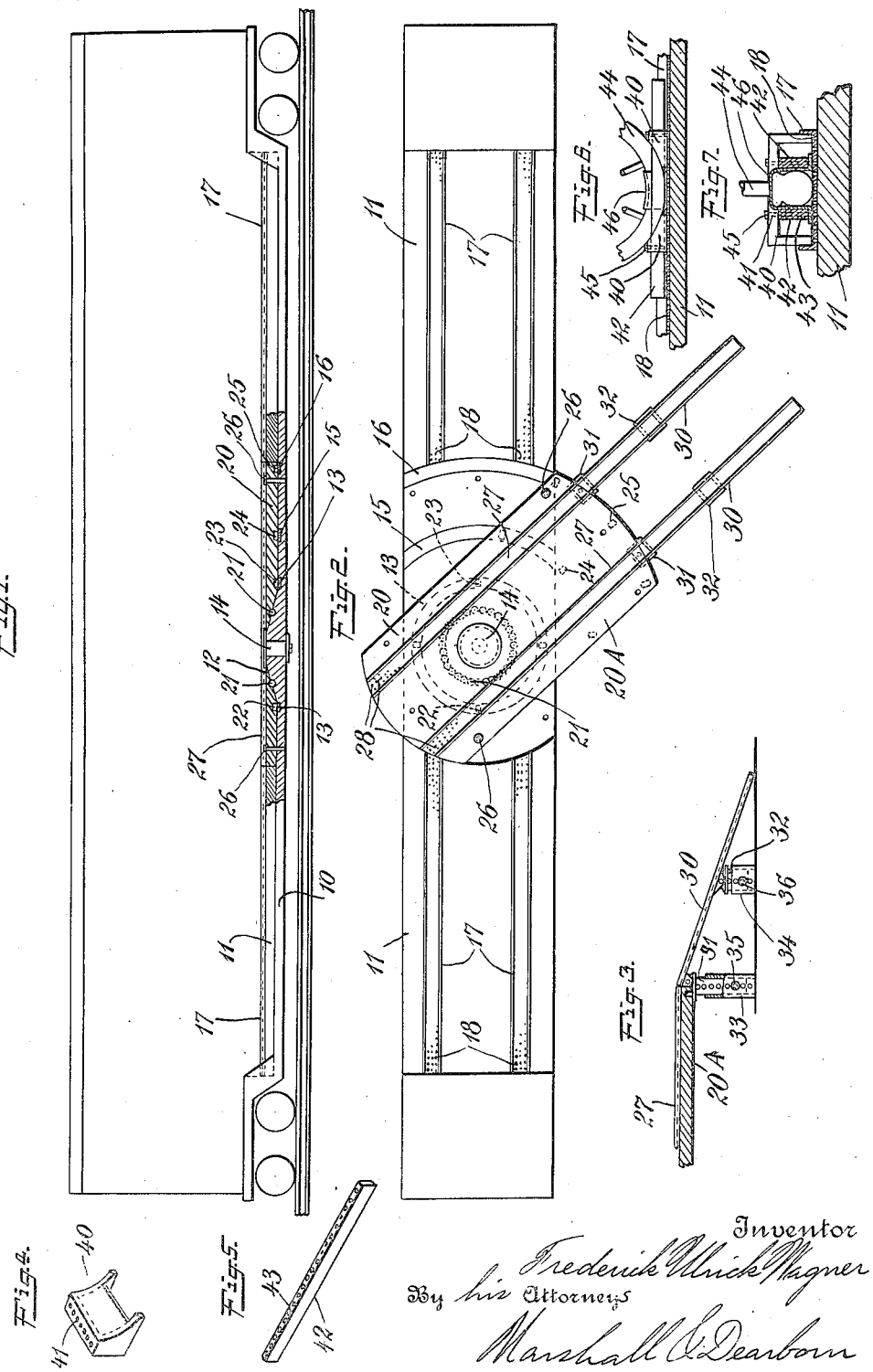

FREDERICK ULRICK WAGNER, OF RAHWAY, NEW JERSEY.

RAILROAD-CAR.

1,271,812. Specification of Letters Patent. Patented July 9, 1918.

Application filed January 4, 1917. Serial No. 140,559.

*To all whom it may concern:*

Be it known that I, FREDERICK U. WAGNER, a citizen of the United States of America, and a resident of Rahway, county of Union, and State of New Jersey, have invented certain new and useful Improvements in Railroad-Cars, of which the following is a specification, reference being had to the accompanying drawing, forming a part thereof, My invention relates to improvements in railroad cars, and its object is to provide a car which is especially adapted for use in the transportation of automobiles, field artillery and other wheeled vehicles. More specifically, its object is to construct a car with means for facilitating the loading and unloading of such vehicles from the side of the car. To this end I provide a turn-table in the floor of the car which preferably has an underslung body.

Another object is to provide adjustable supports and inclined planks for the overhanging end of the turn-table.

A still further object is to construct the car for the reception of attachments which are provided with the car for quickly and securely affixing the vehicles to the floor or platform of the car in such a way that they are insured against displacement during transit.

In order that my invention may be thoroughly understood I will now proceed to describe the same in the following specification, and then point out the novel features thereof in appended claims.

Referring to the drawings:

Figure 1 is a side elevation, partly in section, of a car made according to and embodying my invention.

Fig. 2 is a plan view of the same car with the body portion removed and with the turntable rotated into its loading and unloading position. This figure also shows the inclined planks in position for use.

Fig. 3 is a side elevation of one of the inclined planks with its supports, a part of one of the latter being broken away to show more clearly the construction.

Fig. 4 is a perspective view of an end chock and Fig. 5 a similar view of a side chock which parts are used as a part of this invention.

Fig. 6 is a sectional side elevation of a part of the car platform and an elevation of a part of a vehicle wheel and the end and side chocks, showing the manner in which these chocks are used.

Fig. 7 is a transverse section of the parts shown in Fig. 6.

Like characters of reference designate corresponding parts in all the figures.

10 designates the underframe of the car and 11 its platform. On the underframe is a support 12 of the form of a truncated cone having a flanged wheel base 13 at its base. 14 is a pivot pin in the center of this support. 15 and 16 are segmental transverse tracks on this base, suitably spaced apart.

20 is a turn-table platform rotatable about the pin 14 which is offset from the center of the length of the platform. Between the platform and the cone 12 is a circle of ball bearings 21. Rollers 22 and 23 inserted in the underside of the turn-table platform are adapted to run on the cone base 13, and other rollers 24 and 25 are adapted to run respectively on the segmental tracks 15 and 16.

Holes are provided in the turn-table platform and in the frame of the car for the reception of pins 26 which hold the platform in alinement with the floor of the car when it is in the position in which it is shown in Fig. 1 and which hold it against rotation after it has been swung out into the position in which it is shown at 20ᴬ in Fig. 2.

On the car floor are longitudinally disposed parallel channels 17 in the webs of which are a plurality of screw-threaded holes 18. These channels are spaced apart and are of sufficient width to receive the wheels of vehicles of different widths of tread. On the turn-table platform are similar channels 27 which are in alinement with the channels 17 when the turn-table is in its central position, and these are also provided with screw threaded holes 28.

30 is an inclined plank which rests upon posts 31 and 32 which fit slidably within supporting casings 33 and 34 respectively. A plurality of holes in vertical rows are drilled through these posts and supports.

When the post 31 is raised until the flange at its upper end comes into contact with the underside of the turntable platform in its position 20^A as shown in Fig. 3, a pin 35 is thrust through these holes to thereby cause the posts and supports to hold up the outer end of the turntable. Then a pin 36 is thrust through the post 32 and casing 34 so that these parts support the intermediate part of the plank 30.

Two of these planks with their supports are provided, and these are placed as shown in Fig. 2 in alinement with the turntable channels 27.

A vehicle may now be run onto the turntable platform and the latter rotated to its middle position after which the vehicle may be run off from the turntable onto the channels 17 of the car floor at one end or the other of the turntable. The operation may be repeated and another vehicle run onto the channels at the other end of the car. A third vehicle may be run onto and left on the turntable channels 28. This description is based on the assumption that the car floor and turntable platform are of proper length to accommodate three vehicles. Obviously, unloading is accomplished by reversing the steps set forth.

At station platforms, or at depressed tanks in yards, it may not be necessary to use the inclined planks 30, but, vehicles may be run directly onto or off from the turntable.

After the vehicles are in place on the car, they may be secured thereto by the following simple means: 40 is an end chock,—an inverted U-shaped member through the top of which are drilled a plurality of vertical holes 41 in a transverse row. 42 is a side chock of the form of a bar of rectangular cross-section through which is drilled a longitudinal row of vertical holes 43.

End chocks 40 are placed in front of and back of each vehicle wheel, a portion of one of which is shown in Figs. 6 and 7, and designated by 44. A side chock 42 is placed at each side of the wheel and these extend under the end chocks 40. Bolts 45 are put through the holes 41 and 43 and screwed into the tapped holes 18 or 28 as the case may be. A strip of leather or burlap 46 may be run between the spokes of the wheel over the wheel rim and under the side chocks before they are tightened down. In this way the wheel of the vehicle is securely affixed to the car and the latter is held firmly in place.

I intend no limitations other than those imposed by the appended claims.

What I claim is:

1. A railroad car having a floor, a turntable having a platform at the level of the floor, intermediate the length thereof and forming in one position a continuation of said floor, and means for rotatably supporting said turntable offset longitudinally from the center of the turntable.

2. A railroad car having a floor, a turntable having a platform at the level of the floor and forming in one position a continuation of said floor, means for rotatably supporting said turntable, longitudinally disposed spaced channels affixed to said car floor, and similarly disposed channels affixed to the turntable platform.

3. A railroad car having a floor, a turn table having a platform at the level of the floor, intermediate the length thereof and forming in one position a continuation of said floor, means for rotatably supporting said turntable, longitudinally disposed spaced channels affixed to said car floor, and similarly disposed channels affixed to the turntable platform.

4. A railroad car having a floor, a turntable having a platform at the level of the floor and forming in one position a continuation of said floor, and means for rotatably supporting said turntable, combined with inclined planks having adjustable supports adapted to support an end of the turntable when out of alinement with the car floor.

5. A railroad car having a floor, a turntable having a platform at the level of the floor and forming in one position a continuation of said floor, means for rotatably supporting said turntable, longitudinally disposed spaced channels affixed to said car floor, and similarly disposed channels affixed to the turntable platform, said channels being provided with a plurality of screw-threaded holes, wheel chocks provided with vertical holes; and bolts for securing said chocks to the channels.

6. A railroad car having a floor, a turntable having a platform at the level of the floor, intermediate the length thereof and forming in one position a continuation of said floor, means for rotatably supporting said turntable, longitudinally disposed spaced channels affixed to said car floor, and similarly disposed channels affixed to the turntable platform, said channels being provided with a plurality of screw-threaded holes, end chocks, each provided with a transverse row of vertical holes, side chocks each provided with a longitudinal row of vertical holes, and bolts adapted to pass through the holes in said chocks and to screw into the holes in said channels.

7. A railroad car having a floor, a turntable having a platform at the level of the floor, intermediate the length thereof and forming in one position a continuation of said floor, means for rotatably supporting said turntable, longitudinally disposed spaced channels affixed to said car floor, similarly disposed channels affixed to the turntable platform, said channels being provided with a plurality of screw-threaded holes, end chocks, each provided with a transverse row of vertical holes, side chocks each provided with a longitudinal row of vertical holes, and bolts adapted to pass through the holes in said chocks and to screw into the holes in said channels, combined with inclined planks having adjustable supports adapted to support an end of the turntable when out of alinement with the car floor.

Witness my hand this 23rd day of August 1916.

FREDERICK ULRICK WAGNER.

Witnesses:
 FRANK KEARNEY,
 WILLIAM C. SMITH.